United States Patent [19]
Vlasblom

[11] 3,906,781
[45] Sept. 23, 1975

[54] SOIL PROBES FOR MEASURING VARIOUS SOIL PARAMETERS

[75] Inventor: Adriaan Vlasblom, Den Hoorn, Netherlands

[73] Assignee: Stichting Waterbouwkiendig Laboratorium, Delft, Netherlands

[22] Filed: Feb. 4, 1974

[21] Appl. No.: 439,606

[30] Foreign Application Priority Data
Feb. 9, 1973 Netherlands................. 7301924

[52] U.S. Cl. ............................. 73/84; 73/88 E
[51] Int. Cl.² ..................................... G01N 3/00
[58] Field of Search ........................ 73/84, 88 E

[56] References Cited
UNITED STATES PATENTS
3,372,577  3/1968  Bates et al............................ 73/88 E FOREIGN PATENTS OR APPLICATIONS
168,032  7/1965  U.S.S.R................................ 73/88 E
1,236,655  6/1960  France................................... 73/84

Primary Examiner—James J. Gill
Assistant Examiner—Anthony V. Ciarlante
Attorney, Agent, or Firm—Mason, Mason & Albright

[57] ABSTRACT

A soil probe comprises a tube which carries at its lower end a soil probe tip portion. An annular exterior wall of the tip portion is elastically deformable and has on its inner surface strain gauges arranged to measure the surrounding soil pressure acting on this wall transversely to the axis of the probe. The probe tip portion also contains a water pressure gauge in communication with the exterior of the probe for measurement of the soil water pressure. The two measurements provided by the probe allow the intergranular soil pressure to be derived.

6 Claims, 3 Drawing Figures

SOIL PROBES FOR MEASURING VARIOUS SOIL PARAMETERS

BACKGROUND OF THE INVENTION

1. Field of the Invention.

The invention relates to soil probes for measuring various soil parameters.

2. Description of the Prior Art.

There has been proposed a soil probe arranged to be forced into soil and which consists of a tube with extension pieces. Adjacent the lower extremity of the tube is a conical tip which is sealingly and slidably mounted. This tip is connected to the tube by means of an elastically deformable measuring body provided with strain gauges, so that the forces exerted on the cone during penetration of the tube into the soil can be measured. Such a probe is often provided near its lower extremity with a coaxial sleeve having the same outer diameter as the adjacent tube portion. This sleeve is mounted sealingly and slightly slidably in respect of this tube portion, and is connected by means of a bridge piece to an axially arranged elastically deformable measuring body provided with strain gauges, so that lateral friction (adhesion) forces acting on this sleeve during penetration of the tube into the soil can be measured, from which the lateral friction resistance can be determined.

Such a soil probe suffers from the disadvantage that although a number of important facts in respect of the character of the soil can be collected, it does not measure other important factors such as the intergranular pressure, the pore water pressure, the density (pore volume) and the like, which factors, will be, at least temporarily, locally disturbed considerably during the penetration of such probes into the soil. Such a probe also does not enable the angle at which the lateral friction forces are acting (the friction angle) to be calculated.

There has also been proposed a probe arranged to measure the pore water pressure. This probe comprises a water pressure gauge arranged in a tube. The gauge comprises a small measuring space communicating with the exterior of the probe by means of relatively narrow openings which can act as a filter, so that ground water can penetrate into the measuring space. The measuring space has a deformable wall portion, and its deformation under the influence of the water pressure can be measured.

A probe has also been proposed which allows determination of the density trend in the soil. The probe comprises a tube with at least two pairs of annular electrodes wherein the electrodes of a pair are situated in planes perpendicular to the axis of the tube and on the outer surface thereof. One pair of electrodes is situated within the other pair. In this manner the trend of the electrical conductivity in the soil in the vicinity of the tube can be measured, from which density variations can be derived.

The previously proposed probes are disadvantageous in that it is necessary to make several soundings each with a different probe to acquire measurements of the intergranular pressure, i.e. the soil pressure mutually transferred by the granules, and also the trend thereof during penetration of the probe or the like into the soil.

It is an object of the invention to provide an improved soil probe. It is a further object of the invention to provide a soil probe which allows the intergrannular soil to be measured.

SUMMARY OF THE INVENTION

According to the invention, there is provided a soil probe comprising a tube arranged to be pressed into the soil, and having an axis, the length of said tube being extendable by means of extension tubes, and an annular elastically deformable wall portion having an inner surface and connected to the said tube, strain gauges mounted on the inner surface of the wall portion and arranged substantially in a plane perpendicular to the tube axis, to effect pressure measurement of soil pressure acting transversely to the tube axis, and a water pressure gauge communicating with the medium surrounding the soil probe so as to measure the pressure of groundwater, whereby the intergranular soil pressure can be calculated from the difference between said pressure measurements.

According to the invention, there is also provided a soil probe comprising a tube having an axis, and a soil probe tip portion connected to one end of the tube, the tip portion comprising, a probe tip, a structure connecting the probe tip to the said tube, an elastically deformable wall portion mounted on the structure, at least one strain gauge mounted on the said wall portion so as to measure deformation of the wall portion in a direction transverse to the axis of the tube caused by soil pressure acting in that direction, and a water pressure gauge mounted on the structure and in communication with the exterior of the soil probe for measuring the pressure of surrounding water.

BRIEF DESCRIPTION OF THE DRAWING

A soil probe embodying the invention will now be particularly described, by way of example only, with reference to the following diagrammatic drawing, in which.

DESCRIPTION OF THE PREFERRED EMBODIMENT

Figure 1:
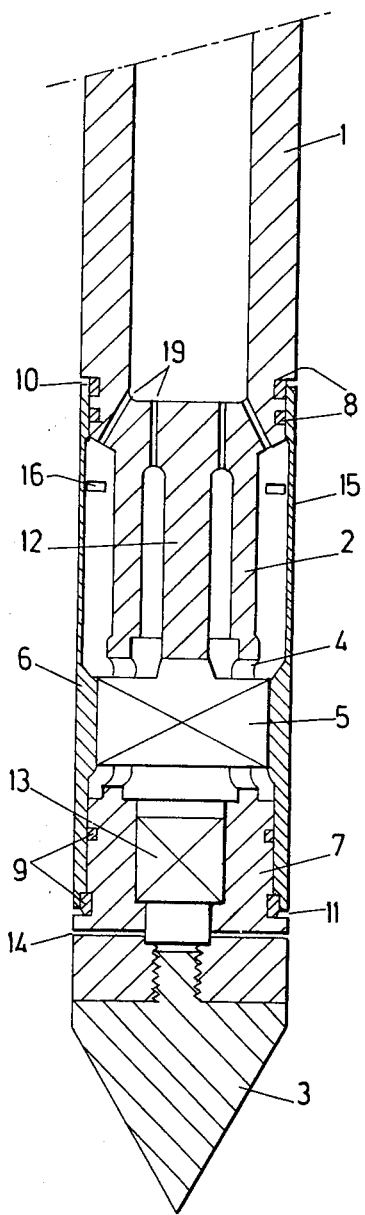
FIG. 1 is a simplified cross-section of the lower part of the probe.

As shown in FIG. 1 the soil probe comprises a probe tube 1 which can be extended by means of similar tubes, and which is sufficiently strong to be forced into the soil.

The tube 1 merges at its lower extremity into a soil probe tip portion comprising a narrower tubular body made up of an upper measuring body 2 and a lower measuring body 7. A measuring cone 3 is mounted at the lower extremity of the body 7. The base diameter of the cone 3 is substantially equal to the diameter of the tube 1. The said narrow tubular body is provided with strain gauges for measuring the forces exerted on the cone 3 during the penetration thereof into the soil, which forces result in a corresponding elastic deformation of the tubular body.

In the lower part of the upper body 2 is a transverse aperture 4, in which a transverse bridge piece 5 is disposed. The bridge piece 5 engages a sleeve 6 which has an outer diameter equal to the outer diameter of the tube 1. The sleeve 6 extends between the upper part of the upper body 2 and the lower body 7, and is sealed with respect to the upper and lower bodies 2 and 7 by means of sealing rings 8 and 9 respectively.

Slots 10 and 11 respectively, are left free at either end of the sleeve 6 so that the sleeve 6 is axially slidable relative to the upper and lower bodies 2 and 7. The bridge piece 5 bears against an axially extending measuring body 12 which, at its upper side, is connected with the upper part of the upper body 2. The different parts of the soil probe tip portion 1, 2, 5, 7 and 12 are shown in the drawing as being made as one single piece, but typically in practice separate parts are used which are inter-connected in a suitable manner, for instance by means of screw connections.

The measuring body 12 is provided with strain gauges. When the tube 1 is pressed into the soil, the lateral friction forces exerted by the surrounding soil, will have a tendency to grip the sleeve 6 and cause movement of the sleeve relative to the upper and lower bodies 2 and 7. This leads to an elastic deformation of the body 12 which is dependent on the lateral friction forces which can therefore be measured by means of the strain gauges of the body 12.

A water pressure gauge 13 is arranged in the lower body 7. This gauge 13 consists of a box with a wall comprising a flexible membrane. The interior of this box communicates with the probe exterior by means of bores 14 which open into the outer wall of the lower body 7. These bores 14 are so narrow that soil granules cannot penetrate. The deformation of the said flexible membrane is measured, for example, by strain gauges to thereby determine the pressure exerted on the membrane by the surrounding soil water. It is also possible to use any other suitable amendment method to determine the water pressure in the surrounding soil.

Figure 2:
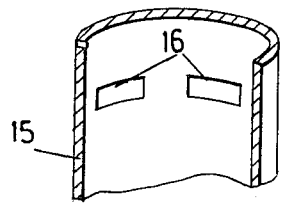
FIG. 2 is a perspective view, partially in crosssection, of a part of the probe.

The sleeve 6 comprises a part 15 having a smaller wall thickness relative to the remainder of the sleeve 6. The part 15 is sufficiently elastically deformable in a radial direction so as to enable the measurement of transverse soil pressure by measurement of the deformation of the part 15 caused by the total soil pressure. The deformation is measured by means of strain gauges 16 (FIG. 2) arranged in annular fashion on the inner wall of the part 15 in a plane perpendicular to the axis of the probe so that only radial deformation of the part 15 is measured. The variations of the axial length of the part 15 caused by lateral friction forces have no influence on this measurement. Provision of the part 15 in the sleeve 6 allows the lateral friction force (as measured by the strain gauges on the body 12) to be measured at substantially the same soil depth at the total soil pressure. The provision of the thin and structurally weak part 15 does not detract from the strength of the bodies 2 and 7 which transmit thrust to the core 3.

Generally, the strain gauges 16 can be of the resistance type and arranged to be connected into a bridge or voltage divider circuit to enable variations of the resistance of the gauges to be measured. However, the temperature of the sleeve 6 may rise as the soil probe penetrates into the soil, giving rise to variations in the resistance values of the gauges 16 in dependence on the temperature of the part 15. Thus a temperature compensation circuit is required. To that end additional strain gauges may be used which are arranged on the inner wall of the part 15 and which therefore have substantially the same temperature as the gauges 16. These additional gauges are arranged parallel to the probe axis and are not therefore subjected to the radial deformation. Such strain gauges are, however, subjected to axial length variations of the part 15 caused by the lateral friction force acting on the sleeve 6, and this will require to be compensated for by, for example, utilisation of the measurements made by means of the strain gauges on the body 12. However, these compensation arrangements are complex and, moreover, the radial deformation of the part 15 will give rise to some axial deformation, so that the compensation strain gauges, if such deformations are to be avoided, should be arranged at some distance from the strain gauges 16 which is, however, generally not possible in view of the restricted dimensions involved.

Figure 3:
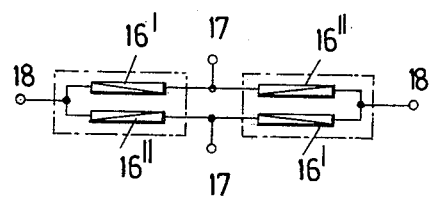
FIG. 3 shows a preferred strain gauge arrangement for the probe.

However, a simpler temperature compensating strain gauge arrangement can be achieved by using pairs of semiconductor strain gauges, in which the elongation coefficient (change of resistance per unit change in length, dR/dl) of one strain gauge of a pair is positive, and of the other one is negative. FIG. 3 shows two pairs of strain gauges each pair comprising one strain gauge 16' and one strain gauge 16" which have opposite elongation coefficient. The strain gauge 16' of each pair is connected in series at a connection point 17 with the strain gauge 16" of the other pair. The connection points 17 from voltage output terminals.

The ends of the strain gauges of each pair which are not directly connected to the points 17 are connected together at a point 18. The points 18 are connected across a current source. This bridge arrangement of the strain gauge, will if the strain gauges have the same unstrained resistance, give rise to a zero output voltage across the terminals 17, when the strain gauges are unloaded. On deformation the resistance of, for instance, the strain gauges 16' will increase and that of the strain gauges 16" will decrease, giving rise to a voltage between the terminals 17. It will be clear that several strain gauge bridge arrangements as shown in FIG. 3 can be distributed around the periphery of the sleeve 6, and can be interconnected in a suitable manner to compensate for the possible occurrence of a symmetrical force distributions therearound.

The semi-conductor strain gauges of the arrangement shown in FIG. 3 all have the same temperature coefficient so that even in the case of a temperature gradient in the radial or axial direction the voltage between the points 17 will not change. Another advantage of such semiconductor gauges is that they have a high sensitivity which is desirable since the part 15 is required to have a certain minimum strength and its deformation under typical values of the external pressures is small.

Passages 19 adjacent the upper part of the body 2 allow the passage of wires from the strain gauge and the water pressure gauge 13 into the interior of the tube 1.

As the soil probe penetrates into the soil, the soil water pressure will be measured at a given point by means of the water pressure gauge 13. However, the total soil pressure which is measured by the strain gauge disposed on the part 15 will be measured at that point only after a time lapse which is dependent on the distance between the openings 14 and the strain gauges 16 and on the penetration speed of the probe. It is possible that the water pressure which is measured near the cone 3 is influenced by the soil deformation caused by the penetration of the cone, and that the effect of this influence will be considerably different in the neighbourhood of the strain gauges 16. If in addition to determining the trend of the water and total pressures, it is also required to corelate corresponding values of the two pressures, a symmetrical arrangement of either two water pressure gauges at both ends of the measuring sleeve, or of two sleeve and strain gauge arrangements on both sides of a water pressure gauge can be used. The arrangement of two water pressure gauges is preferred as it is the simplest. The mean value of the measurement results from both outer measuring elements can be considered as the value near the middle measuring element.

The function of the probe can be extended by including in the tube 1, insulated annular electrodes for determining the electrical conductivity of the surrounding soil, from which soil density information can be derived.

The measurement results of the various measuring elements can be processed as desired. For example from the ratio between the resistance force experienced by the cone and the lateral resistance (as measured by the strain gauges on the body 12) information can be derived about the type of soil. The total soil pressure which is measured by the strain gauge on the part 15 is equal to the sum of the pore water pressure and the intergranular pressure of the soil. Thus the intergranular pressure can be derived which enables the friction angle, i.e. the angle at which the transverse soil forces act, to be calculated from the ratio of the lateral friction resistance and the intergranular pressure. The friction angle is important in determining the bearing capacity of the soil. The ratio of the ratio of core friction resistance to lateral friction resistance, to the ratio of lateral friction resistance to intergranular pressure may also be required.

The penetration of the probe into the soil can be carried out either continuously or step-wise and at different speeds. Measurements can be taken while the probe is stationary. It is also possible to read off the various measurement results during slow penetration under a constant load. Still further information about the soil can be obtained by using additional measuring elements, such as, for instance, an electrical conductivity meter.

I claim:

1. A soil probe comprising
   a tube arranged to be pressed axially into the soil, and having an axis, the length of said tube being extendable by means of extension tubes,
   an annular elastically deformable wall portion having an inner surface, the wall portion being arranged substantially coaxially with the tube and being connected thereto,
   strain gauges mounted on the inner surface of the wall portion to effect pressure measurement of soil pressure acting transversely to the tube axis, the gauges being arranged substantially in a plane perpendicular to the tube axis thereby rendering transverse soil pressure measurements taken as the probe is pressed into the soil independent of lateral friction forces experienced by the probe, and
   a water pressure gauge communicating with the medium surrounding the soil probe so as to measure the pressure of ground water, whereby the intergranular soil pressure can be calculated from the difference between said pressure measurements.

2. A soil probe comprising
   a tube having an axis, and
   a soil probe tip portion connected to one end of the tube, the tip portion comprising
   a probe tip,
   a structure connecting the probe tip to the said tube,
   a measuring sleeve having an outer diameter which is substantially equal to that of the tube, the sleeve sealingly surrounding the said structure and being movable in the axial direction of the tube, a part of said measuring sleeve forming an annular elastically deformable wall portion,
   at least one strain gauge mounted on the said wall portion so as to measure deformation of the wall portion in a direction transverse to the axis of the tube caused by soil pressure acting in that direction,
   an internal measuring body connected to the said structure and to the sleeve,
   strain gauges mounted on the internal measuring body to enable lateral friction forces of the soil to be determined, and
   a water pressure gauge mounted on the structure, and in communication with the exterior of the soil probe for measuring the pressure of surrounding water.

3. A soil probe according to claim 2, in which the thickness of the deformable wall portion is smaller than the thickness of the adjacent sleeve.

4. A soil portion according to claim 2, further comprising,
   an additional water pressure gauge, the two water pressure gauges being symmetrically arranged on both sides of the said deformable wall portion with respect to the axial direction of the tube.

5. A soil portion according to claim 2, further comprising
   an additional annular elastically deformable wall portion, and
   additional strain gauges mounted on the additional wall portion for measuring soil pressure acting transversely to the tube axis, the two deformable wall portions being symmetrically arranged on both sides of the said water pressure gauge with respect to the axial direction of the tube.

6. A soil probe according to claim 2, in which the said strain gauges are arranged in pairs wherein one strain gauge has a positive elongation coefficient and the other strain gauge has a negative elongation coefficient, two of such pairs of strain gauges being combined to form a measuring bridge, in which one strain gauge of one sign of coefficient of one pair is connected in series with the strain gauge of the other sign of coefficient of the other pair.

* * * * *